March 20, 1928.
C. R. GARNER
HACK SAW FRAME
Filed Sept. 13, 1927
1,663,076
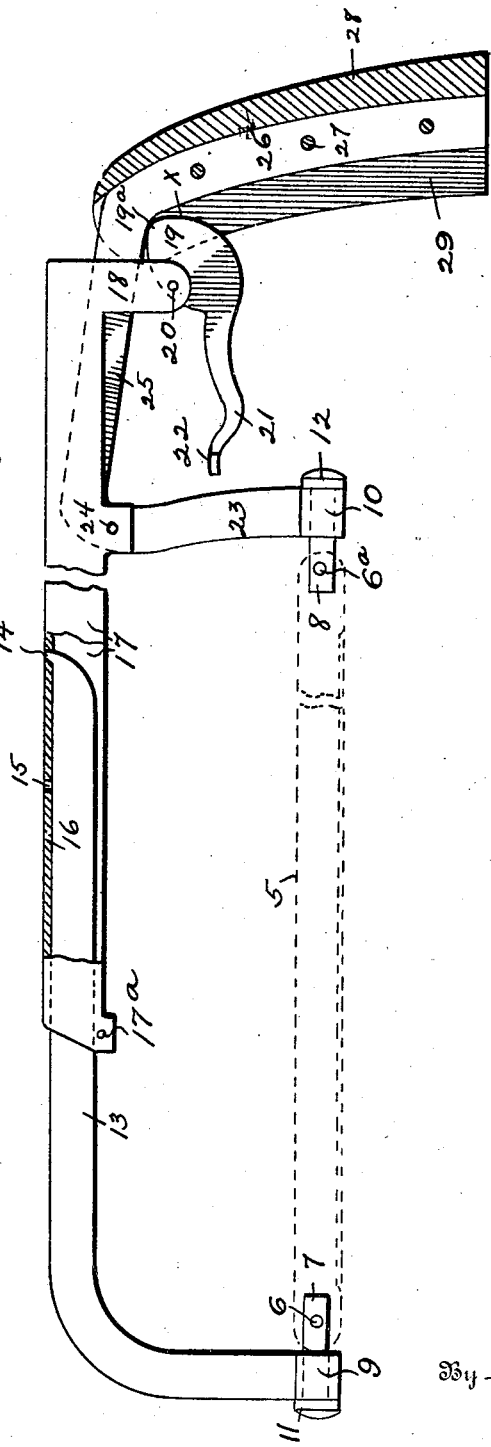

Patented Mar. 20, 1928.

1,663,076

UNITED STATES PATENT OFFICE.

CHARLIE R. GARNER, OF CHASE CITY, VIRGINIA.

HACK-SAW FRAME.

Application filed September 13, 1927. Serial No. 219,267.

This invention relates to hack saws, and it has for its object to provide a simple and inexpensive device of this character, constructed in such manner that the saw blade may be inserted therein, or released therefrom, with a minimum expenditure of time, and with very little trouble, while, at the same time, the saw blade will be securely held in place, and under proper tension, during the time that the tool is in use.

In the accompanying drawing.

Fig. 1 is a view partly in side elevation, and partly in section, of a hack saw, constructed in accordance with the invention; and Fig. 2 is a horizontal sectional view through the handle thereof.

Like numerals designate corresponding parts in both of the figures of the drawing.

Like many of the hack saws, now commonly in use, the saw blade 5, of the present invention, is adapted to engage transversely extending pins 6—6$^a$, of stub shafts 7 and 8, the latter being disposed in eyes 9 and 10, and being provided with heads 11 and 12. The eye 9 is located at the extremity of an L-shaped member 13, the extremity of the long arm of which is provided with a tongue 14, and is adapted to take into any one of a series of openings 15, formed in the connecting walls 16 of the U-shaped sheath 17. A pin 17$^a$ extends transversely between the sides of the sheath 17, and prevents displacement of the member 13 from said sheath.

The rear end of the sheath 17 is provided with downturned ears 18, in which a cam 19 is pivoted at 20. This cam is provided with an operating handle 21, which terminates in a transverse tongue 22. The eye 10 is located at the extremity of a leg 23, of a frame member of substantially inverted U-shape, which is pivoted at 24 to the sheath 17, and comprises a rearwardly extending run 25, which terminates in the handle shank 26. This shank is secured by transversely extending pins 27 to grip-sections 28. These grip sections may be made of wood, metal, hard rubber, or any other suitable material, and, as clearly shown in Fig. 2, they are so shaped as to leave an open slot 29 at the front of the grip, into which the handle 21 of the cam 19 swings.

The operation of the device is as follows: When a saw blade is to be inserted in the hack saw frame, the parts are moved to the position illustrated in Fig. 1, at which time the hack saw frame is in "broken" position. That is, the run 25 has been thrown downwardly to lie at an angle with respect to the sheath 17. This results in swinging the leg 23, and consequently the pin 6$^a$, forwardly or toward the pin 6 of stub shaft 7. The operator then grasps the grip with the right hand, and manipulates the saw blade 5 to engage its usual openings with the pins 6—6$^a$. This he can easily do, because his left hand is left free to do this work, and as soon as the openings of the saw blade have been engaged with the pins 6—6$^a$, the operator, with the fingers of the right hand, swings the handle 21 downwardly and rearwardly into the groove or slot 29 of the grip. This causes the nose 19$^a$ of the cam 19 to thrust upwardly upon the member 25, until said member lies in substantial alignment with the sheath 17. This movement of these parts into alignment with each other results in swinging the leg 23, and the pin 6$^a$ carried thereby, away from the pin 6, and places the saw blade under tension. The movement of the cam 19 is such as to cause it to move to past-center position. That is, by the time the handle 21 has seated itself in the slot 29, the cam will have moved to a position where its portion X will be bearing against the underside of the run 25, and the tension of the blade 5 will tend to hold the parts in locked position. When the handle 21 swings downwardly into the groove, its transverse extension 22 projects laterally beyond the grip, as illustrated in Fig. 2, where it may readily be engaged by the thumb, and thrown outwardly, if it be desired to release the blade. To this end, the side of the grip is cut away slightly, as at 30.

It will readily be understood that the making of the one part of the frame in two pieces, as the piece 13, and the teeth 17, is merely for the purpose of rendering the device adjustable to receive saw blades of varying lengths. However, this is a feature of construction old in hack saw frames, and I do not claim it otherwise than in conjunction with the remainder of my improved construction, as hereinafter defined in the claims.

It is to be understood that the invention is not limited to the precise construction set forth, but that it includes within its purview whatever changes fairly come within either the terms or the spirit of the appended claims.

Having described my invention, what I claim is:

1. A hack saw frame, comprising a pair of frame members pivoted to each other for rocking movement with respect to each other, one of said frame members comprising a longitudinally extending run and a downturned forward end portion, which carries a member adapted to engage one end of the hack saw blade, the other of said frame members comprising a hand grip portion, and a downturned leg carrying a member adapted to engage the other end of said hack saw blade, and a manually operable cam acting between said frame members to rock them with respect to each other to move the leg of the grip portion away from the downturned member of the other frame portion.

2. A hack saw frame, consisting of a pair of frame members, one of which comprises a longitudinally extending portion, terminating in a downturned forward end, carrying a member adapted to engage the forward end of the hack saw blade, the other frame member comprising a longitudinally extending run, a downturned grip portion, and a downturned leg at the forward end of the longitudinal run, the last named frame member being pivoted to the first named frame member at a point intermediate the length of the first named frame member, and a cam pivoted to the rear end of the first named frame member, and acting against the longitudinal run of the last named frame member, to move the longitudinal runs of the two frame members into alignment with each other, as and for the purposes set forth.

3. A hack saw frame, comprising two parts, pivoted for rocking movement with respect to each other, one of said parts comprising a longitudinally extending run, including members rendering it adjustable as to length, and terminating in a downturned forward end, carrying a member adapted to engage the forward end of the hack saw blade, a downturned portion at the rear end of said frame member, the other of said frame members being of substantially inverted U-shape, the rear leg of which carries grip members having a slotted front face, and the last named frame part being pivoted to the first named frame part at a point materially in advance of the downturned portion at the rear end thereof, and a cam pivoted in said downturned members at the rear end of the first named part of the frame, said cam comprising a handle extension lying in position to be engaged by the fingers of the hand which holds the grip and while the grip is held within the hand.

4. A hack saw frame comprising a pair of frame members pivoted for rocking movement with respect to each other, each of said frame members carrying an element adapted to be engaged with an end of a hack saw blade, the rocking of the two frame members with respect to each other, placing said blade under tension, a downwardly directed hand grip constituting the rear end of one of said frame members, and a manually operable cam acting between the two frame members to rock them with respect to each other to place the hack saw blade under tension, said cam comprising a handle which lies in front of the grip and in position to be operated by the fingers of the hand which holds the grip, and while the grip is held within the hand.

In testimony whereof I affix my signature.

CHARLIE R. GARNER.